Figure 1:
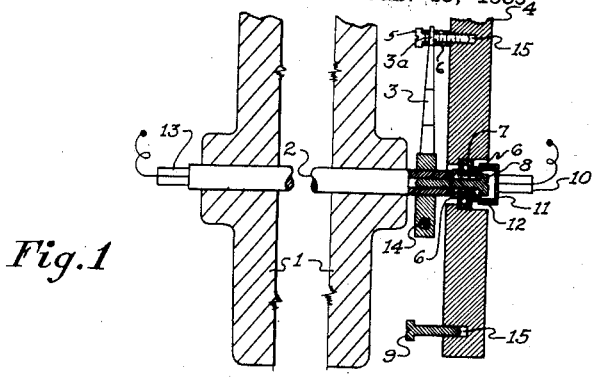

Nov. 18, 1941.                J. T. LOGAN ET AL                2,263,512
                             ELECTRICAL SUPERVISION
                             Filed Jan. 23, 1939

INVENTORS
James T. Logan
BY John H. Miles
ATTORNEY

Patented Nov. 18, 1941

2,263,512

UNITED STATES PATENT OFFICE 2,263,512

ELECTRICAL SUPERVISION

James T. Logan and John H. Miles, Atlanta, Ga.

Application January 23, 1939, Serial No. 252,439

2 Claims. (Cl. 200—52)

This invention relates to supervisory systems, and in particular to those systems responsive to an inferior quality of electric service.

The primary object of the invention is to provide a means for quickly detecting and in many instances actually anticipating the inability of an electric power system to continue the delivery of electric service of a quality commensurate with commercial requirements and to instigate operations necessary to correct matters.

The purpose of this invention is accomplished by comparing the rate of speed change of an electric motor whose speed of rotation is controlled by conditions on an electric power system, with a standard rate of speed change such as is provided by the free rotation of a mass under the influence of kinetic energy opposed by the action of windage and friction. There are other methods of accomplishing the invention such as power factor measurement of the energy supplied a motor whose armature possesses considerable inertia, however, it is the action of kinetic energy that makes this latter method operable, therefore the principle of operation is basically the same as that of the electromechanical device described herein.

This invention differs from conventional frequency and voltage responsive devices in that its principal elements rotate continuously, drawing from the power system a small quantity of energy the quality of which is under continuous test. The driving element may be an electric motor connected directly to the power system or the motive source may be the shaft of a machine driven by a motor connected to the power system. The object of the motive source is to provide the invention with a rotating element whose speed of rotation can be employed as a measure of the quality of electric service available.

Depending upon the application, the speed of rotation of the motive element may be controlled by the frequency, voltage or the product of the voltage and current. It is not essential that the speed of rotation of the motive element be exactly proportional to the electrical quantity controlling the speed, however, in many instances this may be desirable.

To describe the performance of this invention responding to under-frequency, over-frequency, under-voltage, over-voltage, under-power and over-power would be superfluous, as it will become obvious from the following detailed description of the response to under-frequency that the principle of operation can be and is intended to be applied for response to any of the electrical conditions just stated. The principal difference in the mechanical arrangement of the elements in this invention for response to "under" or "over" as in under-frequency or over-frequency is that in the former the motive element drives or pushes the inertia element ahead while in the latter it pulls the inertia element through a flexible or elastic connection between the two.

This invention comprises, in general, a motive element such as an electric motor, an inertia element for storing kinetic energy driven by the motive element but free to rotate a portion of one revolution with respect to the shaft of the motive element, contacts or other means for completing or opening an electric circuit in event the rate of rotation of the motive element becomes appreciably different from that of the inertia element, thus resulting in the angular relation of the two, over a period of time, changing a predetermined amount; 360 angular degrees being one complete revolution of the inertia element with respect to the shaft of the motive element.

Prior to this invention frequency and voltage responsive devices have been made but in general they respond to predetermined values. This invention differs from these devices in that it responds to the rate of change. As an illustration, a conventional frequency responsive device such as is generally used today, if set to operate at 58 cycles, 60 cycles per second being normal, will operate at this frequency value whether it requires the system frequency a fraction of a second or minutes to decrease from the normal frequency of 60 cycles to 58 cycles. This invention will respond at 58 cycles only if the rate of decrease from 60 cycles is rapid enough to indicate inability of the power system to restore normal 60 cycle frequency without relief. If the rate of change in frequency were very rapid this invention could operate within one-tenth second or at, say 59 cycles, the rate of change controlling the speed of response as well as the value to which it responds.

The rate of speed change principle is employed in this invention because it affords an ideal means for anticipating conditions in advance of time. In other words advantage is taken of the fact that the large amount of rotating mass connected to a power system, due to the action of kinetic energy, opposes abrupt changes in the rate of speed or frequency deviation from normal during the integral of time required for response of this invention. Clarifying this statement, if the rate of frequency decrease on a power system were at the constant rate of 6 cycles per second per second, at the end of the first one-half second the system frequency would have become 57 cycles, 60 cycles per second being normal. This invention is capable of detecting this condition within one-tenth second or by the time the system frequency has dropped to about 59.2 cycles per second. Its operation in one-tenth second is indicative that the frequency would drop to 54 cycles within one second.

In this invention, which has been in use under the inventors supervision since March 28, 1938, the inertia element driven at a constant speed, zero rate of speed change, is propelled against windage and friction by a driving arm fastened rigidly to the shaft of the motive element. When the power system frequency begins to decrease the speed of the motive element changes accordingly. The kinetic energy stored in the inertia element causes the inertia element to oppose any sudden change in its state of equilibrium, therefore it continues to rotate at a speed retarded only by the resistance of windage and bearing friction. With the motive element undergoing speed changes and the inertia element assuming an inherent rate of retardation, the angular relation of the two undergoes a change. By this is meant that if a line be drawn from the centre or point of pivot of the inertia element to its periphery parallel to the driving arm of the motive element, the angular difference between the two would be zero degrees. Now, as the rate of rotation of the two become different the angular relation of the line and driving arm change, a complete revolution of the inertia element with respect to the driving arm being 360 degrees.

If the rate of change in angular relation between the motive and inertia elements is slow the chances are good that the governing equipment controlling the prime movers of the electric power generators will correct the condition and that the angular relationship will return to zero degrees or approximately so, which is normal. If on the other hand, the change in angular relationship of the two elements becomes rapid enough, it is indicative that the sources of power generation are no longer capable of furnishing satisfactory electric service to the particular power load supervised by the invention; consequently, means are provided for completing or opening an electric circuit at predetermined angular differences between the motive element and the inertia element for the purpose of effecting circuit breaker operation or other operations necessary for meeting the emergency.

For all practical intent this invention may be regarded as a pilot. Its ability to accurately predict impending unsatisfactory frequency conditions in advance of time makes it indispensable in the execution of high-speed switching which is so essential to electric power systems stability during serious disturbances. As an example, a power system supplied from more than one source of generation experiences a sudden decrease in frequency due to the failure of an important generating source. If the rate of frequency decrease is not too rapid, chances are good that surplus spinning generating capacity will automatically come to the rescue and restore normal frequency after a few seconds. On the other hand, if the rate of frequency drop is very rapid, relief must be given the remaining generating sources very quickly or the entire power system may collapse. It is possible for this invention to distinguish between the above two conditions within one-tenth second and in the latter case cause circuit breaker or other operations necessary to avoid a complete system collapse.

Another typical application of this invention would be to a silk loom. On actual test it has been determined that if the motor driving the loom varies in speed more than 15 percent over a period of two-tenths seconds, the cloth will be streaked due to slightly different spacing of the threads. This invention can detect a condition of this nature within one-tenth second or before the speed has varied more than 10 percent and operate the loom stop motion, thus preventing an inferior grade of cloth. This same loom might permit a speed change of 25% without damaging the cloth if the time of change were spread over, say 2 seconds. In the latter case this invention would not operate to stop the loom, which of course would be desirable. The principal cause of motor speed variations to this type of apparatus is from sudden voltage drops rather than from actual changes in frequency of the power system. As already stated, this invention being responsive to voltage or frequency changes, depending upon the application, is ideally suited to protect such operations.

Another application for this invention is to quickly detect the complete loss of power source and instigate operations for removing synchronous apparatus from the line preparatory to immediate restoration of service by rapid reclosing of the circuit breaker controlling the flow of current to the power circuit so interrupted. There is no practical means commercially available today for accomplishing this operation without purposely delaying the restoration of service, in order to avoid incorrect operations, so long until the advantages of rapid restoration of service is lost. This invention can detect the opening of the power source circuit breaker and effect the removal of synchronous and/or other apparatus from the power circuit within one-fourth second.

The application already made by the inventors is for the purpose of detecting the loss of the major power source to a load area. This invention detects the loss of the major power source, a long transmission line, and instigates sectionalization of the load area, leaving a portion of the load, within capacity, on a local generating plant and making it possible to provide immediate circuit breaker reclosing to the major power source, thus avoiding temporary curtailment of service to the load not held by the local plant. The entire operation is accomplished within one second.

Figure 2:
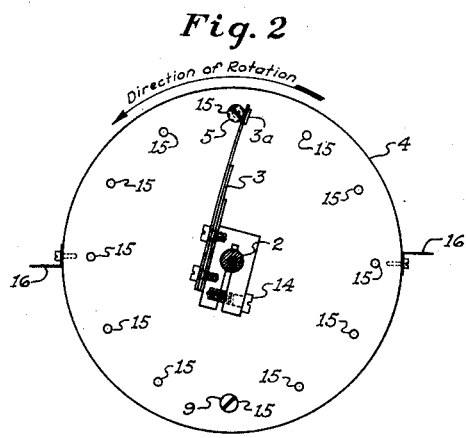
Figure 3:
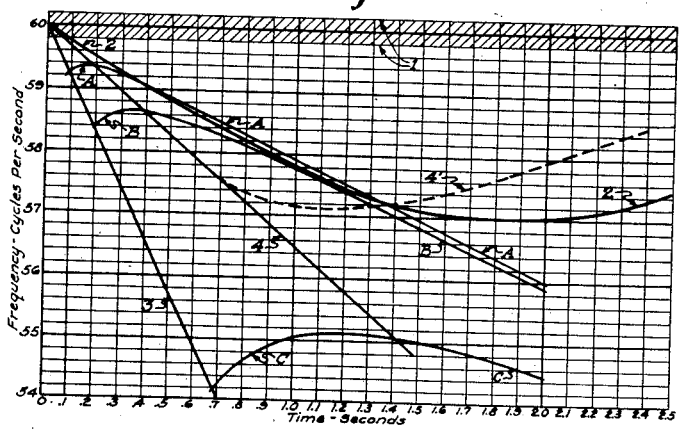

For a better understanding of this invention reference is made to the accompanying drawing:

Figure 1 is a side elevation showing the motive element, driving arm and inertia element assembly, the latter two being shown in section. Figure 2 is an end view of the driving arm and inertia element viewed from the motive element end, showing the means of propelling the inertia element and the manner in which the electric circuit is completed. Figure 3 shows graphically the approximate frequency-time characteristics of the invention and of a power system in various states of equilibrium.

The drawing is representative of response of the invention to under-frequency, under-voltage or under-power and is not intended to show a device responsive to over-frequency, over-voltage or over-power.

Referring to Figures 1 and 2, I represents the motive element such as an electric motor which may be one of many types generally known to the art. To the motor shaft 2, is fastened the driving arm 3 employed to propel the inertia element 4 by contacting the electrically insulated screw 5. Electric insulation is represented by 6. The inertia element 4 is mounted on bearing 7 which is electrically insulated from the motor shaft 2 by insulation 6. Screw 8 fastens insulation 6 to the motor shaft 2, thus insulating the inertia element 4 and bearing 7 from the motive element except when screw 9 contacts 3a, attached to driving arm 3. When this contact is made a metallic bridge across insulation 6 is established completing an electric circuit through brush 10 and cap 11, which in turn contacts collar 12 resting, metal to metal, against bearing 7; through inertia element 4 and screw 9 to contact 3a on driving arm 3, through motor shaft 2 and brush 13.

Screw 14 is employed as one means for clamping driving arm 3 to motor shaft 2. Screws 5 and 9 may be shifted with respect to one another by placing in threaded holes 15 in the relation to secure desired time of operation. Driving arm 3 may be constructed in the best manner to prevent shock in cases of abrupt changes in speed of the motive element.

In order to change the inherent rate of retardation of the inertia element 4 to meet varying conditions of service requirements provisions are made to attach fans 16 to the inertia element. This is necessary in order to protect all types of manufacturing processes. Some processes can tolerate rather rapid rates of speed change while the more delicate processes can tolerate only mild changes in rates of driving motor speed changes. The number of fans required depends upon the application of the invention, the rate of retardation of the inertia element being adjusted to correspond with the maximum rate of retardation permissible in the motive element which represents the reaction of industrial motors to frequency decreases.

The response of this invention to decreases in speed is very simple. At normally constant speed arm 3 rests against screw 5, thereby driving inertia element 4 at the same speed. Assume that the power system frequency begins to decrease resulting in a decreasing speed of rotation of the motive element shaft 2. Inertia element 4 continues to rotate at a speed governed by the influence of kinetic energy stored in it in opposition to the action of windage and friction. If the system frequency rate of decrease is more rapid than the rate of retardation of the inertia element screw 9 will gain on arm 3, the rate of gain depending upon the rate of speed drop reflected in motive element 1, which as stated before is related to the power system frequency.

If this condition persists screw 9 will overtake driving member 3 and complete an electric circuit through contacts 9 and 3a, the time required being somewhat inversely proportional to the difference in rates of retardation of the two elements. As previously stated the time of response of this invention can be further varied by the relation of screw 5 with respect to screw 9 in holes 15.

The desirable characteristics embodied in this invention are shown approximately in Figure 3, plotted with reference to time in seconds as the abscissa and frequency in cycles per second as the ordinate. In Figure 3 the band of system frequency variations permissible for all classes of service is shown as 1. Line 2 represents the frequency-time characteristics of a power system in temporary distress. Variations in system frequency in the area between band 1 and line 2 is generally tolerable, provided sufficient idle generating capacity is connected to the power system for quickly restoring the system frequency to normal. Line 2 may vary considerably with respect to either the abscissa or ordinate or both, depending upon such factors as system inertia, ratio of system load to connected generating capacity and prime mover governor response.

For applications of this invention to delicate industrial loads, line 2 may have to coincide very closely with band 1, in order to prevent damage to the finished product or a break in the manufacturing process. In any case the invention can be adjusted to operate at the maximum permissible limit of frequency variation. Line 3 represents the speed-time curve of a fully loaded motor when the electric power source is completely interrupted. Frequency-time curves falling between lines 2 and 3 indicate serious trouble and that generating sources connected to the power systems must have immediate relief in the form of reduced service demand or a complete system collapse may result. It is in the area between lines 2 and 3 where this invention proves its superiority over conventional frequency devices due to its ability to anticipate conditions for short periods in advance of time.

Curves A, B and C are representative of the operating characteristics of this invention, A representing minimum time of response, B representing the setting corresponding to the maximum permissible emergency frequency variations on a particular power system and C representing maximum time setting. The number of such characteristic curves available are determined by the number of holes 15 in inertia element 4, Figure 2, there being one less curve than holes. The time of response can be increased above that shown by curves A, B and C in Figure 3 by applying fans 16 as required to the inertia element 4.

From Figure 3 it is seen that this invention can detect the complete loss of power supply, frequency-time curve 3, in approximately 0.08 second or by the time the speed of rotation of the motive element drops to a value corresponding to 59.2 cycles. The response at this point indicates that a speed corresponding to 54 cycles can be expected in 0.7 second. This invention set to operate on curve B operates within 0.4 second or at approximately 58.6 cycles for a system rate of retardation along line 4 and can effect circuit breaker operations necessary for interrupting enough electric service to permit the remaining generating sources to restore normal frequency along line 4'. The invention anticipated a system collapse sufficiently in advance for effecting its prevention.

The time of response of this invention and the frequency at such time is determined from the point of intersection of the frequency-time retardation curve such as line 4, Figure 3, and the characteristic curve of response as A, B or C, reading down for time and to the left for frequency.

Having described this invention in accordance with provisions of the patent statutes employing what is considered as the most practical means for accomplishing the aims it is desired to have it understood that the invention can be carried out by other means and that the intent is to reserve rights to any changes or variations that may appear to those skilled in the art or fall within the scope of the following claims:

What is claimed is:

1. An electro-mechanical device for use in connection with an alternating current electric motor whose speed of rotation is controlled by the frequency of the alternating current supplied thereto, comprising a rotatably mounted inertia element and means for driving it from the shaft of said motor, said driving means including a driving arm affixed to the motor shaft and a stop carried by the inertia element, the free end of the arm bearing against the stop to drive the inertia element from the motor shaft when the latter is rotating at normal speed due to normal frequency of the alternating current supply to the motor but completely separable from the stop to enable the inertia element to continue to rotate free of said shaft due to its stored kinetic energy, acting in opposition to friction, upon decrease in the speed of rotation of said shaft in response to a decrease in said alternating current supply frequency, and circuit controlling means, said means including a contact member carried by the inertia element and the driving arm and operable upon a predetermined decrease in the speed of rotation of said shaft relative to the speed of rotation of said inertia element to effect engagement of said contact with said arm to establish an electrical circuit.

2. In a circuit controlling device, a pair of rotatably mounted elements and means for rotating one of them which is the driving element in accordance with the frequency of an alternating current circuit, one of said elements which is the inertia element having a greater inertia against speed change than the other, a driving connection between said driving one of said elements and the inertia element, said driving connection including a driving arm affixed to the driving element and a stop carried by the inertia element, the free end of the arm bearing against the stop to drive the inertia element from the driving element when the latter is rotating at normal speed due to the constant frequency of the alternating current supply to said driving element but completely separable from the stop to enable the inertia element to continue to rotate when said driving element decreases in speed in response to a decrease in said constant frequency condition, and means including a contact member circumferentially adjustable with respect to the inertia element and coacting with said arm for controlling an electric circuit upon the departure of said elements from synchronism by a predetermined amount following a decrease in frequency of said alternating current circuit below its normal value.

JAMES T. LOGAN.
JOHN H. MILES.